Dec. 27, 1966 S. BARBINI 3,295,011
TRIGGERING DEVICE FOR SPARK-GAP COMPRISING
A LASER AND DESTRUCTIBLE SHIELD
Original Filed Oct. 27, 1964 5 Sheets-Sheet 5
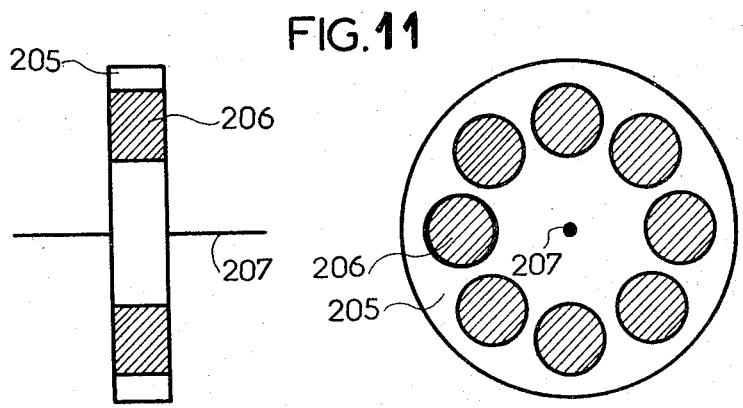
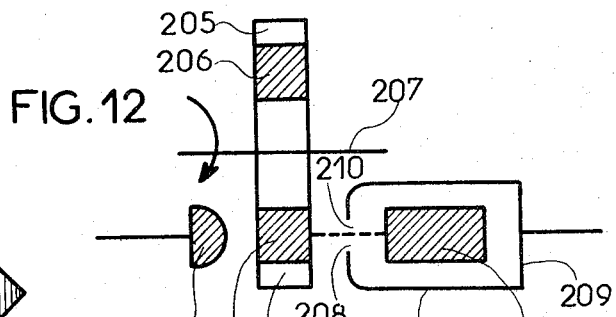
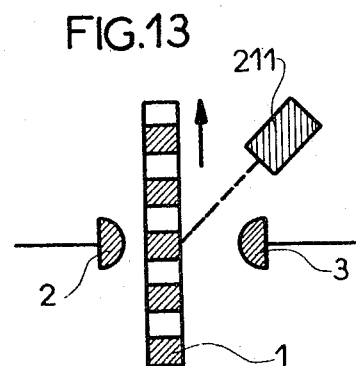
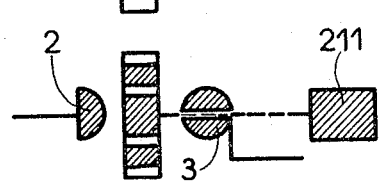

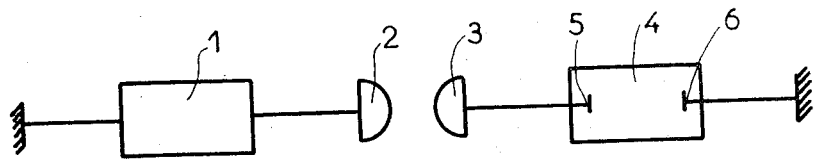
FIG.1
FIG.2
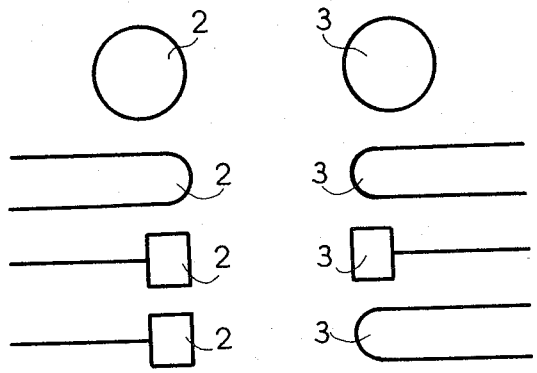

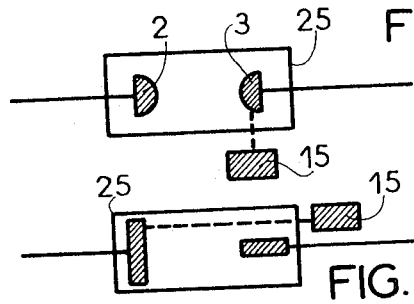
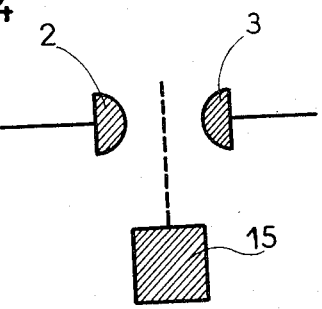
FIG. 4
FIG. 5
FIG. 3
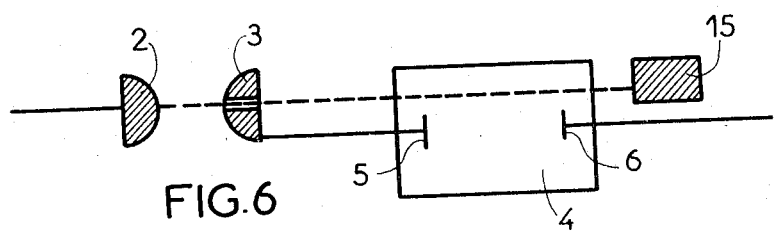
FIG. 6
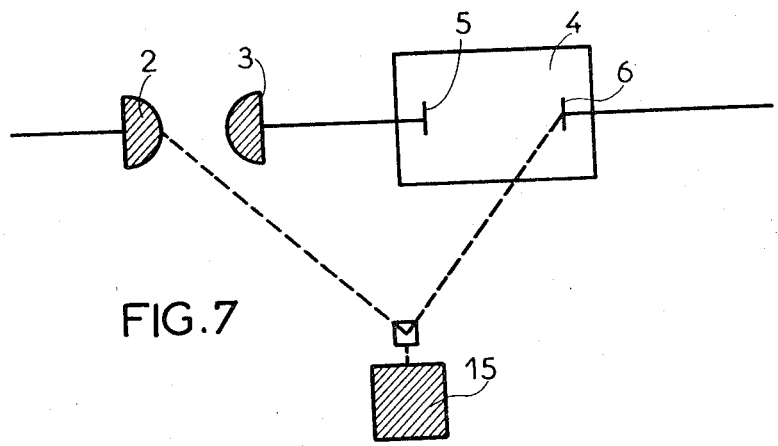
FIG. 7

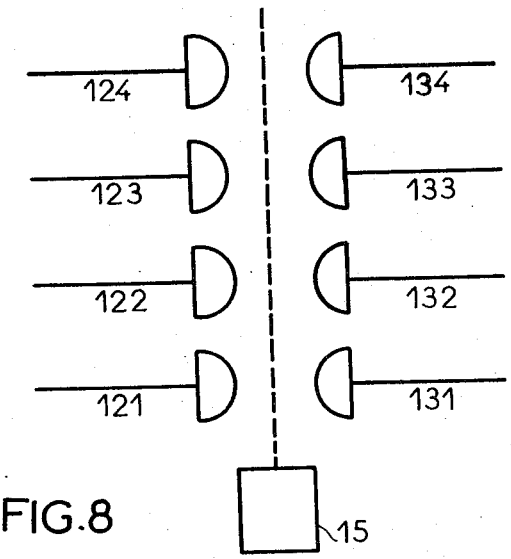
FIG.8
FIG.9
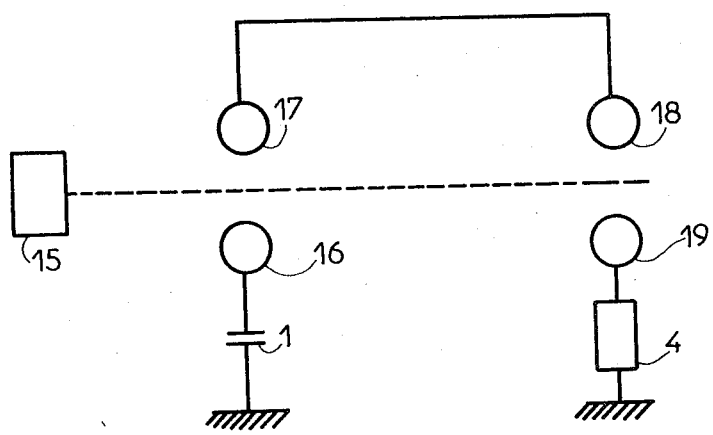

United States Patent Office 3,295,011
Patented Dec. 27, 1966

3,295,011
TRIGGERING DEVICE FOR SPARK-GAP COMPRISING A LASER AND DESTRUCTIBLE SHIELD
Spartacus Barbini, Chaville, France, assignor to Compagnie General d'Electricite, Paris France
Original application Oct. 27, 1964, Ser. No. 406,866. Divided and this application Oct. 22, 1965, Ser. No. 515,280
Claims priority, application France, Oct. 28, 1963, 952,065, 952,066, 952,067; June 4, 1964, 977,058
4 Claims. (Cl. 315—149)

This application is a divisional application of my copending application Serial No. 406,866, filed October 27, 1964, entitled "Triggering Device for Spark Gap."

The present invention has for its purpose to provide a solution to the problems arising from the necessity of quick closing of the electric circuits in which an electric energy storage must deliver a very large current into a relatively weak load under a very high voltage. The very quick passage of a very large electric energy is very difficult to achieve because the circuit breakers or the switches generally used to close the electric circuits do not possess the required characteristics, namely a steep enough rising front with a large enough closing capacity and a small enough control time constant.

In some cases, the sudden discharge of an electric energy storage into an impedance circuit relatively weak is obtained by means of electrodes between which occurs an electric arc when the difference of potential between the electrodes exceeds the breakdown voltage.

It has also been suggested to place between the electrodes an insulating shield, the destruction of which would allow the passing of a discharge spark; this destruction may be obtained by the shattering effect of an explosive cap, of mercury fulminate for instance. This solution proved to be unsatisfactory, the effect of the explosive being insufficiently quick.

Accordingly, the object of the present invention is a device, for the triggering of a spark-gap, more particularly remarkable in that the ionization of the dielectric between the electrodes of the spark-gap is caused by a device of the type designated by the abreviation "laser."

In one embodiment of the invention the closing of the circuit is not obtained by ionizing of the gaseous medium between the electrodes but by destroying of an insulating shield placed between these electrodes.

According to the invention, a solid dielectric material shield is placed between the electrodes of the spark-gap, the spark-gap discharge being obtained by destroying this shield with a light beam, of very high energy density, delivered by a laser.

This method of application allows the utilization of electrodes with appropriate insulators, the position of the electrodes being, should the occasion arise, adjustable.

In a further embodiment of the present invention, the laser beam used for the triggering of the spark-gap may be set into action in such a manner that its energy comes in addition to the energy of the electric discharge in the spark-gap. It is thus possible to realize devices of quick discharge in enclosures used for the study of plasmas.

Further objects of the invention include embodiments of spark-gaps, combined with other devices. Other advantages and characteristics of the invention will appear from the following description, by no means limitative and which will be better understood with reference to the accompanying drawings on which:

FIGURE 1 represents the general diagram of a discharge circuit.

FIGURE 2 is a sectional view of possible structures of electrodes.

FIGURES 3, 4, 5, 6, 7 show variants of the device according to the invention.

FIGURE 8 shows the application of the device according to the invention or the simultaneous triggering of several spark-gaps.

FIGURE 9 represents an example of application to a spark-gap divided into partial-gaps.

FIGURE 11 represents a sectional view and a front view of a shield being part of a device according to another way of application of the invention.

FIGURE 12 represents a schematical view of a device according to the invention.

FIGURES 13 and 14 represent variants of the invention.

Figure 10:
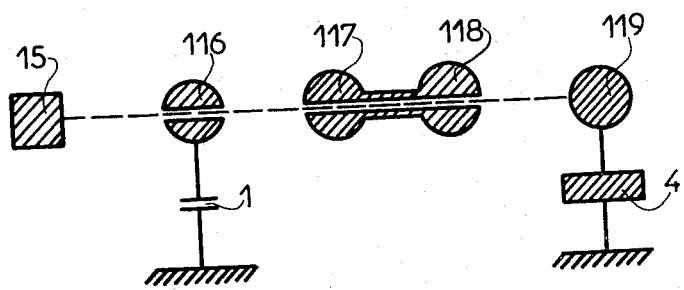
FIGURE 10 shows a variant of the device according to the FIGURE 9.

On FIG. 1 has been represented, to facilitate the explanation, the diagram of a discharge circuit which is composed of an electric energy storage 1 (capacity) connected, on the one hand, to the earth, and on the other hand, to an electrode 2, the other electrode 3 being connected to the earth through the intermediary of a load. The load can be, for example, a gas tube 4 comprising two electrodes 5 and 6, the tube being full of a gas, the reaction of which is being studied to an electric discharge between the electrodes 5 and 6. The electric energy storage may be, for example, a capacitor loaded to 100 kilovolts and storing an energy of the order of 100 kilojoules. The electric discharge in this tube is obtained when the electrodes are short-circuited by an electric arc, the producing of the electric arc being a function of the circumstances determined by the Pashen's law.

The discharge in the tube 4 previously triggered then depends on the discharge between the electrodes 2 and 3 brought to a difference of potential higher than the breakdown voltage.

This breakdown voltage can be considered lowered by previous ionization of the gaseous dielectric between the electrodes. It depends, on the other hand, on the geometrical shape of the electrodes which can, by example, be made so as ot make use of the effect called "effect of points."

FIG. 2 represents schematically sections of different types of electrodes used in devices called spark-gaps.

The discharge of a circuit such as the one represented on FIG. 1 can be obtained by the lowering of the breakdown voltage caused by a partial ionization of the dielectric space comprised between the electrodes.

Different types of devices allow to ionize partially this dielectric space: the best known are those which make use of a radiation, such as X-rays, high frequency electromagnetic fields or sparking devices of the type of the sparking-plugs used in the internal combustion engines.

The spark-gap according to the invention can be embodied with numerous variants, the examples of which are given by the settings shown in the following figures.

The electrodes of the spark-gap can be symmetrical (2-3, FIGURE 3), the laser 15 being located outside. The shape of the electrodes depends on the position of the laser as also on the required circumstance of operation.

In the case of the FIGURE 3 the laser 15 used is advantageously a triggered laser, a focusing of the beam enabling not to direct this latter onto one of the electrodes but onto the volume of dielectric gas between the two electrodes. The electrodes can be housed in an enclosure 25 under a weak gas pressure easily ionizable (cooperation of thermic tearing away of the metal electrons and of the gas ionization by heating), the enclosure being provided with a window allowing the passage of the luminous beam of the laser. The enclosure housing the electrodes can be under vacuum, in this case, then, the thermic tearing away of the electrons alone produces the triggering of the electric arc. Examples of these embodiments have been schematically represented on the FIGURES 4 and 5.

The locating of the laser outside the spark-gap offers many advantages by the fact that it does not set anymore the insulating problem of the laser control circuits. Moreover, in the case of triggered lasers, the luminous beam may be split into two parts, as in the FIGURES 6 and 7, one of them being directed to the spark-gap as it has been described above, the other part of the beam being used to produce the partial ionization of the gas which would be enclosed in the discharge tube constituting the load 4 of the electric circuit as shown on the FIGURE 1. According to the invention, other arrangements of the laser are possible; for example, the laser beam may cross the discharge tube 4, constituting the load of the circuit, before to hit the electrode 2 through an opening provided in the electrode 3 (FIGURE 6).

It is possible to enlarge the application of such a device, specially the device represented in the FIGURE 3, with several spark-gaps. In this case, the axis of a laser device crosses the spaces between the electrodes of several spark-gaps spaced out along said axis. In this case the laser beam is used as parallel beam or as a variant may be focused on the last spark-gap, in the space between the electrodes on one of the electrodes of this last spark-gap.

On another part, it is known that the price of a spark-gap for high voltage increases much more rapidly than its operating voltage. If it is possible to replace a spark-gap for $U$ kilovolts by $n$ partial spark-gaps in series, each operating under the voltage $U/n$, the price of the installation will be considerably lowered for a convenient value of $n$.

According to another characteristic of the invention a possible embodiment of such an arrangement would be to connect $n$ partial spark-gaps in series and to place them along the axis of a laser beam which, at the moment of its appearing, will trigger all of them at the same time.

Preferentially the axis of the spark-gaps are set perpendicularly to the axis of the laser and are, or not, parallel to each other and the axis of the laser beam crosses each space between electrodes substantially in its middle. But one may deviate from these conditions without going out of the scope of the invention. The shapes of the electrodes and their spacing can be identical in all the spark-gaps or variable from one spark-gap to the other as well as the voltages. The spark-gaps may belong to different circuits.

In FIGURE 8, according to the axis of a laser 15 are alined $n$ spark-gaps, among which four of them are represented on the figure: the spark-gaps are constituted by the electrodes 121–131, 122–132, 123–133, 124–134. When the laser emits its radiation beam according to its axis, all the spark-gaps are simultaneously triggered in an extremely short time.

In the FIGURE 9, a source of direct voltage for example a loaded capacitor 1 under a voltage $U$ can discharge itself into a load 4 through two spark-gaps 16, 17 and 18, 19 each of one being liable to absorb a voltage $U/2$. When a laser 15 emits its radiation the two spark-gaps are simultaneously triggered and the discharge occurs. The number of two spark-gaps has been chosen as $n$ non limitative example.

In the example of embodiment represented in FIGURE 10, the four electrodes 116, 117, 118, 119 are alined, the three first ones being crossed by a channel where passes the beam emitted by the laser 15. The beam may be stopped by the surface of the fourth electrode 119. In this case the beam acts by ionization of the gases between the electrodes 116 and 117 on the one hand and 118 and 119 on the other hand, the action being in this second case increased by the impact of the beam onto the electrode 119. This embodiment which is not limited to two spark-gaps, allows a specially simple structure of the electrodes such as 117 and 118 which are for instance made of two spheres connected by a tube. A simplified construction of the electrode and of the insulators is thus obtained.

The invention is not limited to the examples of embodiments given above as illustrations; it applies generally to the triggering of at least two spark-gaps by means of only one laser beam.

In the embodiment according to the FIGURES 11 and 12, a barrel 205 is located between the two electrodes 2 and 3: this barrel may revolve around an axis 207 and is set rotating by a mechanism not shown in the figure; the mechanism may be self acting for a series of experiments. The barrel comprises a certain number of windows 206 in which are placed disks made of solid dielectric. The barrel itself may be made out of a rigid insulating substance, resisting very high temperatures. When the barrel is made of metal, the windows housing the insulating disks are, on principle, large enough to prevent the metal of the barrel from initiating the discharge between the electrodes 2 and 3. The barrel is arranged in a way ensuring that the windows are located between the electrodes 2 and 3. The distance between the electrodes is determined so that the voltage of the storage 1 be higher than the breakdown voltage when there is no insulating material in the window 206. The electrode 2 may have any shape while the electrode 3 is advantageously made according to the structure of the above described electrodes.

For example, the electrode may be made up of a cylindrical member closed by two surfaces 208 and 209, the surface 208 being matched to the surface of the electrode 2 and comprising an opening 210. A laser 211 is located inside the hollow electrode 3 (FIGURE 12) so that the light beam which it produces be directed onto the electrode 2 through the opening 210. The control and supply of the laser are achieved by circuits which are not shown on the figures.

The insulating disks of the barrel may be made out of a large number of substances, the selection of the substance depending mainly on the power of the laser used, on the fusibility of the substance, on the price, on the required thickness, on the mechanical properties, etc. . . . For example, these substances may be polymers sold under the trademarks Teflon, polystyrene, Mylar, Bakelite, Celeron, Lucoflex, etc.

The operation of the device is as follows: a driving signal controls the triggering of the laser 211 which sends through the opening 210 a light beam which impinges upon the insulating disk 206 held in a window of the barrel 205. The high-power radiation of the laser destroys this disk; the distance between the electrodes being such that in the absence of the insulating material 206 the potential difference is sufficient to cause the triggering of an electric arc in an extremely short time, the load inserted in the spark-gap circuit is crossed by a very intense current with a very steep rising front. When the storage 1 is fully run down, the electric arc dies out and the mechanism connected to the barrel rotates the latter one step, bringing an intact disk into the position of the disk which has been destroyed by the laser beam.

The spark gap triggering device according to the invention offers many advantages which make it possible to use, in particular, a same spark gap for a very broad voltage range, the switching from one voltage to another requiring only the replacement of the disks carried by the barrel.

The design of the spark-gap as per FIGURES 11 and 12 has been given only as an illustrating example, which is in no way limiting, many variants being possible without departing from the scope of the invention. For instance, the dielectric shield between the electrodes may be shaped as a continuous strip with rectilinear motion, each motion replacing, between the electrodes, a destroyed section of dielectric by an intact one. This strip may be a thick composite strip (FIGURE 13) made of rigid material and provided with windows in which are housed dielectric disks.

The laser may be located outside the electrodes and act upon the dielectric either obliquely (FIGURE 13) or through an opening provided in one of the electrodes (FIGURE 14). Likewise, the whole of the spark-gap device may be either in the open or housed in a leak-tight enclosure filled with a gas under any pressure so as either to help the burning of the dielectric and participate in the melting, or to prevent the burning so that the laser action on the dielectric be restricted to causing its melting.

The device according to the invention offers a great number of advantages among which the most important are the reduction of the spark-gap self-inductance and the possibility of realizing a spark-gap to be used for a range of voltage sources from 10 to 100 kv., by means of a very small modification of the distance between the electrodes.

In an embodiment of the present invention, the laser beam used for the triggering of the spark-gap may be set into action in such a manner that its energy comes in addition to the energy of the electric discharge in the spark-gap. It is thus possible to realize devices of quick discharge in enclosures used for the studying of plasmas.

What I claim is:

1. A device for controlling quick discharge of an electric energy storage circuit into a relatively weak load under high voltage comprising: a pair of metallic electrodes defining a spark gap, one of said electrodes connected to said energy storage circuit and the other connected to said load; a solid dielectric shield located in said spark gap between said electrodes; and a selectively triggered laser having a high density luminous beam directed onto the surface of said dielectric shield whereby said beam destroys the shield initiating an electric discharge across said gap.

2. A device according to claim 1, characterised in that said solid dielectric shield is made up of a material taken from the group of materials consisting: Teflon, Mylar, "Lucoflex," Bakelite, Polystyrene, Celoron.

3. A device according to claim 1, characterised in that said dielectric shield comprises a plurality of disks housed in means defining windows provided in a plate located on said spark-gap, said plate being rotatably supported for sequentially positioning one of said windows between said electrode means defining said spark gap.

4. A device according to claim 3, characterised in that said solid dielectric shield comprises a plurality of disks housed in means defining windows provided in a barrel means for rotatably supporting said barrel about an axis parallel to the symmetry axis of a pair of electrodes of said electrode means, said windows being arranged in the barrel in a circular configuration whereby said windows are each sequentially positioned between said electrodes upon rotation of said barrel.

No references cited.

JOHN W. HUCKERT, *Primary Examiner.*

J. D. CRAIG, *Assistant Examiner.*